(12) United States Patent
Aubreville et al.

(10) Patent No.: US 11,601,765 B2
(45) Date of Patent: Mar. 7, 2023

(54) METHOD FOR ADAPTING A HEARING INSTRUMENT AND HEARING SYSTEM THEREFOR

(71) Applicant: SIVANTOS PTE. LTD., Singapore (SG)

(72) Inventors: Marc Aubreville, Nuremberg (DE); Stefan Petrausch, Erlangen (DE); Erik Harry Hoydal, Nuremberg (DE)

(73) Assignee: Sivantos Pte. Ltd., Singapore (SG)

( * ) Notice: Subject to any disclaimer, the term of this patent is extended or adjusted under 35 U.S.C. 154(b) by 660 days.

(21) Appl. No.: 16/722,443

(22) Filed: Dec. 20, 2019

(65) Prior Publication Data

US 2021/0195343 A1 Jun. 24, 2021

(30) Foreign Application Priority Data

Dec. 20, 2019 (DE) .............................. 102019220408

(51) Int. Cl.
*H04R 25/00* (2006.01)
*G06F 3/0482* (2013.01)

(52) U.S. Cl.
CPC ......... *H04R 25/505* (2013.01); *G06F 3/0482* (2013.01); *H04R 25/507* (2013.01); *H04R 25/55* (2013.01); *H04R 25/558* (2013.01); *H04R 25/70* (2013.01); *H04R 2225/39* (2013.01); *H04R 2225/41* (2013.01); *H04R 2225/55* (2013.01)

(58) Field of Classification Search
CPC ...... H04R 25/55; H04R 25/70; H04R 25/505; H04R 25/507; H04R 25/558; H04R 2225/39; H04R 2225/41; H04R 2225/55; G06F 3/0482
See application file for complete search history.

(56) References Cited

U.S. PATENT DOCUMENTS 7,742,612 B2 * 6/2010 Frohlich .............. H04R 25/507
381/314
9,883,297 B2 1/2018 Ungstrup et al.
(Continued)

FOREIGN PATENT DOCUMENTS

CN 105519138 A 4/2016
CN 107786930 A 3/2018
(Continued)

OTHER PUBLICATIONS

Alexandre E. et al.: "Exploring the Feasibility of a Two-Layer NN-Based Sound Classifier for Hearing Aids", 15th European Signal Processing Conference (EUSIPCO 2007), Poznan, Poland, Sep. 3-7, 2007, pp. 227-231.
(Continued)

*Primary Examiner* — Huyen D Le
(74) *Attorney, Agent, or Firm* — Laurence A. Greenberg; Werner H. Stemer; Ralph E. Locher (57) ABSTRACT

For the fitting of a hearing instrument, an audio signal of an ambient sound, recorded by way of an input transducer, is modified according to a multiplicity of signal processing parameters. Via a first classifier, a user of the hearing instrument is offered a plurality of problem descriptions for the user to select. By way of a second classifier, a proposed solution for modified values of the signal processing parameters is determined based on the user's selection of one of the offered problem descriptions.

21 Claims, 6 Drawing Sheets

(56) References Cited

U.S. PATENT DOCUMENTS

| | | | |
|---|---|---|---|
| 11,310,608 B2* | 4/2022 | Schoen | G06K 9/6267 |
| 11,323,827 B2* | 5/2022 | Boretzki | H04R 25/554 |
| 2011/0051963 A1 | 3/2011 | Barthel et al. | |
| 2018/0063653 A1 | 3/2018 | Aschoff | |
| 2018/0288534 A1* | 10/2018 | Aubreville | H04R 25/00 |
| 2019/0102142 A1 | 4/2019 | Christiansen et al. | |
| 2019/0149927 A1 | 5/2019 | Zhang et al. | |

FOREIGN PATENT DOCUMENTS

| | | |
|---|---|---|
| EP | 2306756 A1 | 4/2011 |
| EP | 3236673 A1 | 10/2017 |
| WO | 2017118477 A1 | 7/2017 |

OTHER PUBLICATIONS

Xiang J. J. et al.: "Evaluation of Sound Classification Algorithms for Hearing Aid Applications", IEEE ICASSP 2010, pp. 185-188.

* cited by examiner

METHOD FOR ADAPTING A HEARING INSTRUMENT AND HEARING SYSTEM THEREFOR

BACKGROUND OF THE INVENTION

Field of the Invention

The invention relates to a method for fitting a hearing instrument. The invention also relates to an associated hearing system.

In the following, the term "hearing instrument" is used broadly to refer to devices that receive an audio signal from an ambient sound, modify and in particular amplify the signal, and deliver a correspondingly modified audio signal to the hearing of a user (wearer) of the hearing instrument. A subclass of such hearing instruments, classically referred to as "hearing aids," are designed from a medical standpoint for providing care to people who are suffering from hearing loss. To this end, a hearing aid usually comprises an input transducer, for example in the form of a microphone, a signal processing unit with an amplifier, and an output transducer. The output transducer is usually implemented as an electro-acoustic converter, in particular as a miniature loudspeaker, and in this case is also referred to as a "receiver." In addition, bone conduction hearing aids, implantable or vibrotactile hearing aids are also available on the market. In these hearing aids, the damaged hearing is stimulated either mechanically or electrically.

In addition to the above-described classical hearing aids, hearing instruments are offered to support the hearing ability of users with normal hearing. Such hearing instruments, also known as Personal Sound Amplification Products or Personal Sound Amplification Devices (PSAD), are similar in structure to classical hearing aids and likewise have the above-described components, namely an input transducer, a signal processing unit and an output transducer.

To meet individual wearers' numerous individual needs, different hearing instrument types have become established. In Behind-The-Ear (BTE) hearing instruments, a housing is worn behind the ear that contains the battery and, if applicable, also contains other components such as input transducers, signal processing units, and the like. The output transducer may then be arranged directly in the wearer's ear canal (in the case of receiver-in-the-channel (RIC) hearing instruments). Alternatively, the output transducer may be arranged inside the housing worn behind the ear. In this case, a flexible sound tube directs the audio signal of the output transducer from the housing to the ear canal. In the case of ITE (In-the-Ear) hearing instruments, a housing containing all functional components is worn at least partially in the ear canal. Completely-in-canal (CIC) hearing instruments are similar to ITE hearing instruments, but are worn entirely in the ear canal.

Modern hearing instruments commonly comprise a multiplicity of signal processing functions, such as for example frequency-selective amplification, dynamic compression, adaptive noise suppression, wind noise suppression, and speech or voice recognition, the manner of operation of which may be adjusted by a variety of signal processing parameters (for example, amplification factors, compression characteristics, and the like). Correctly setting the signal processing parameters enables the hearing instrument to be optimized to the user's individual needs, in particular the user's hearing ability, and is therefore of decisive importance for the successful use of the hearing instrument. Due to the multiplicity of signal processing parameters and their complex interaction, users typically cannot (or cannot adequately) fit the hearing instrument themselves. Rather, the fitting of hearing aid parameters is an iterative and lengthy process that usually requires multiple meetings between the hearing instrument user and an audiologist. This fitting process is made particularly difficult by the fact that real hearing situations that arise in everyday life cannot be satisfactorily reproduced at the audiologist's practice, and thus the suitability of the selected parameter settings for everyday use cannot be tested on-site. In addition, due to many users' lack of specialized audiological knowledge, they are often unable to formulate the problems that arise in sufficiently precise terms for the audiologist to be able to provide a targeted remedy.

SUMMARY OF THE INVENTION

The object of the invention to enable an effective fitting of a hearing instrument. In particular, the fitting should be able to be carried out automatically without an audiologist being involved, and should not require the user to have any audiological knowledge.

With regard to a method for fitting a hearing instrument, this object is accomplished according to the invention as claimed. With respect to a hearing system, the object is accomplished according to the invention by the features as claimed. Advantageous embodiments and refinements of the invention are set out in the dependent claims and the following description.

The invention presumes a hearing instrument of the above-described type, in which an audio signal from ambient sound is recorded by means of an input transducer is modified in accordance with a multiplicity of signal processing parameters. The input transducer is in particular an acousto-electric converter, in particular a microphone. The audio signal in this case is an electrical signal that conveys information about the ambient sound received. The signal processing parameters are quantities (i.e. variables in the technical sense), such that each signal processing parameter may be assigned a changeable value. Signal processing parameters may be one-dimensional (scalar) or multidimensional (for example vectoral). In the latter case, the value assigned to the signal processing parameter in turn comprises a plurality of individual values. The term "fitting of the hearing instrument" refers specifically to adapting the signal processing parameters, i.e. assigning to at least one of the signal parameters a new value that differs from the previous value.

The hearing system comprises the hearing instrument and a fitting unit that carries out the method for fitting the hearing instrument. Within the scope of the invention, the fitting unit may be an electronic component, for example an ASIC, in which the functionality for carrying out the method is realized as circuitry (hard-wired). Preferably, however, the fitting unit is a software unit (i.e. a computer program). In both embodiments, the fitting unit may be either integrated or implemented in the hearing instrument or in a separate peripheral device, for example a remote control or programming device. Preferably, the fitting unit is in the form of an app that is associated with the hearing instrument and interacts with the hearing instrument, the app being properly installed on a smartphone or other mobile device of the user. In this case, the smartphone or mobile device is commonly not part of the hearing system itself, but is only used as an external resource.

In a first step of the method, via a first classifier, which is in particular a part of the above-mentioned fitting unit, a user of the hearing instrument is offered a plurality of problem descriptions for selection. The problem descriptions are output to the user in text form, for example via a screen of the user's smartphone, or acoustically by means of automatically-generated spoken language.

If the user selects one of the offered problem descriptions, for example by tapping a corresponding button on the display of his smartphone, in a second step of the method, a second classifier, which likewise is also in particular part of the aforementioned fitting unit, determines at least one (first) proposed solution for modified values of the signal processing parameters, based on the selection the user has made. The term "modified values of signal processing parameters" should be understood in a general sense and also comprises proposed solutions that propose a modification of only one value of a single signal processing parameter. The proposed solution thus defines a change of at least one of the signal processing parameters compared to the existing parameter settings. The proposed solution contains, by way of example, at least one (absolute) value, for at least one of the signal processing parameters, that deviates from the current parameter setting in the hearing instrument, or a relative specification for changing the existing value of at least one signal processing parameter (for example, increasing a specific amplification factor by 3 dB).

This two-stage process effectively supports the user in identifying and precisely formulating the problem to be solved by fitting the hearing instrument, and this also considerably simplifies the targeted solving of the problem and thus the optimized fitting of the hearing instrument.

The fitting unit of the hearing system is adapted, by means of circuitry or programming, to carry out the method according to the invention. For this purpose, the fitting unit comprises the first classifier and the second classifier. The below-described embodiments of the method correspond to the corresponding embodiments of the hearing system. Effects and advantages of the individual method variants may be transferred to the corresponding hearing system variants and vice versa.

Preferably, the first classifier (hereinafter also called the "problem classifier") pre-selects the problem descriptions offered based on environment data that characterizes the acoustic environment of the hearing instrument and/or user data that characterizes the user. In particular, this first classifier selects a small number of problem descriptions—which are relevant according to the environmental and user data—from a much larger number of predetermined problem descriptions, for example 5 out of 60 stored problem descriptions. Additionally or alternatively, in an expedient embodiment, the problem classifier makes a preselection by sorting the stored problem descriptions according to relevance. Both measures highlight a few presumably relevant problem descriptions for the user out of the multiplicity of possible problems.

In an advantageous refinement of the method, the second classifier (hereinafter also called the "solution classifier") also uses environment data characterizing the acoustic environment of the hearing instrument and/or user data that characterizes the user to determine the proposed solution. The consideration of environmental and/or user data supports a targeted search for suitable proposed solutions. As a result, the risk of unsuccessful attempts to fit the hearing instrument is reduced.

For environment data, the first classifier and/or second classifier in the course of the method in particular use an average (sound) level of the recorded audio signal, in particular a mean value of the level formed over a predetermined time period (for example over the last 10 minutes), an average signal-to-noise ratio, in particular a mean value of the signal-to-noise ratio taken over a predetermined time period (for example over the last 10 minutes), a noise class associated with the audio signal (for example "Speech," "Music," "Speech with background noise," "Motor vehicle," and the like) and/or data on wind activity (i.e. data indicating whether and, if so, to what extent wind noise interferes with the recorded audio signal).

Additionally or alternatively, within the scope of the invention, additional environment data that is characteristic of the acoustic environment of the hearing instrument may be taken into account by the first and/or second classifier.

Preferably, the following user data is considered by the first classifier and/or second classifier (individually or in any combination):

data that characterizes a hearing ability of the user (for example audiogram data), data that characterizes the acoustic linkage of the hearing instrument with the user (this data indicates in particular whether the hearing instrument is designed for an open or a closed fitting, i.e. whether the hearing instrument enables the user to directly hear the ambient sound or whether it acoustically seals the ear canal), data concerning the type of the hearing instrument, the age of the user, the gender of the user, a degree of activity of the user (i.e. a measure of the physical and/or social activity of the user, wherein the physical activity is analyzed, for example, by means of a motion sensor worn on the user's body inside or outside the hearing instrument, and wherein the social activity is analyzed, for example by analyzing the user's speech activity, for example the frequency of speech phases), the user's location (for example by indicating the country in which the user lives or is present), the user's language, and/or an indication of the user's need for advice (for example on a scale from 1 to 5).

"User data" thus also refers in particular to data that characterizes the user's hearing instrument or the user's interaction with the hearing instrument, because such data is specific to the user and thus also characterizes the user.

In an expedient configuration of the invention, the first classifier and second classifier use the same combination of environmental and user data. Alternatively, it is conceivable within the scope of the invention that the first classifier and second classifier access different environment data and/or user data.

In an advantageous variant of the invention, the first classifier is designed as a self-learning system that automatically optimizes its mode of operation by analyzing the interaction with the user. For this purpose, in the course of the method, the first classifier detects selection frequencies that indicate how often the user selects each of the problem descriptions. In this case, the first classifier takes into account the detected selection frequency in the preselection of the problem descriptions offered and/or the sequence thereof. In particular, frequently-selected problem descriptions are offered to the user with higher priority than less-frequently-selected problem descriptions.

Preferably, the proposed solution is tested by setting the modified values of the signal processing parameters in the hearing instrument that correspond to the proposed solution—optionally after confirmation by the user—so that the hearing instrument is operated with the modified signal processing parameters. The user is asked to evaluate the proposed solution. In the evaluation, the user is given the opportunity in particular to accept or reject the parameter adjustments that will be implemented in the hearing instrument. Depending on the result of the evaluation, the changed values of the signal processing parameters in the hearing instrument that correspond to the proposed solution are retained (in case of positive evaluation) or discarded (in case of negative evaluation). In the latter case, the change is in particular reversed. This means that the parameter values that were in effect before the change are restored.

In an expedient embodiment of the invention, the second classifier is used to determine a plurality of different proposed solutions in the manner described above—simultaneously or successively one after the other. If the proposed solution first tested receives a negative evaluation, an alternative proposed solution determined by the second classifier is then tested. For this purpose, the modified values of the signal processing parameters in the hearing instrument that correspond to this alternative proposed solution are set.

This method is preferably performed iteratively a plurality of times: The user is asked to evaluate the alternative proposed solution; in turn, depending on the result of the evaluation, the corresponding values of the signal processing parameters in the hearing instrument are retained or discarded. In particular, the iteration is terminated if the user evaluates a proposed solution positively or discontinues the method.

In an advantageous embodiment of the invention, the second classifier is also designed as a self-learning system. To this end, the second classifier takes into account previous evaluations in determining the or each proposed solution. In particular, the second classifier gives lower priority to proposed solutions that the user has previously given a negative evaluation than to those that the user has given a positive evaluation or has not evaluated.

In an expedient embodiment of the invention, the selection the user has made of one of the problem descriptions offered, together with the or each proposed solution and, where appropriate, the user's associated evaluation, is fed as a data set into a knowledge base that holds corresponding data sets of a multiplicity of users. Expediently, the knowledge base is implemented outside of the hearing instrument and fitting unit, and in particular is or may be connected to the fitting unit via the Internet. Preferably, the knowledge base is implemented in a cloud database. The data sets contained in the knowledge base are used to determine suitable default settings for the first classifier and/or second classifier.

Preferably, the first classifier and/or second classifier are designed as an artificial neural network, in particular as a fully networked, multi-layer feedforward network. In this case, in particular, the first classifier and/or second classifier are trained with the data sets contained in the knowledge base.

In an expedient alternative, the first classifier and/or second classifier are designed as a decision tree.

In the preferred use case, the hearing instrument of the hearing system is a hearing aid designed for the care of hearing impaired persons. In principle, however, the invention may also be applied to a hearing aid with a personal sound amplification device. In particular, the hearing instrument has one of the above-mentioned designs, in particular a BTE, RIC, ITE or CIC device. The hearing instrument may also be an implantable or vibrotactile hearing aid.

BRIEF DESCRIPTION OF THE SEVERAL VIEWS OF THE DRAWING

In the following, exemplary embodiments of the invention are described in greater detail with reference to a drawing. The drawings show the following.

DESCRIPTION OF THE INVENTION

In all drawings, parts, sizes and structures that correspond to one another are always assigned the same reference signs.

Figure 1:
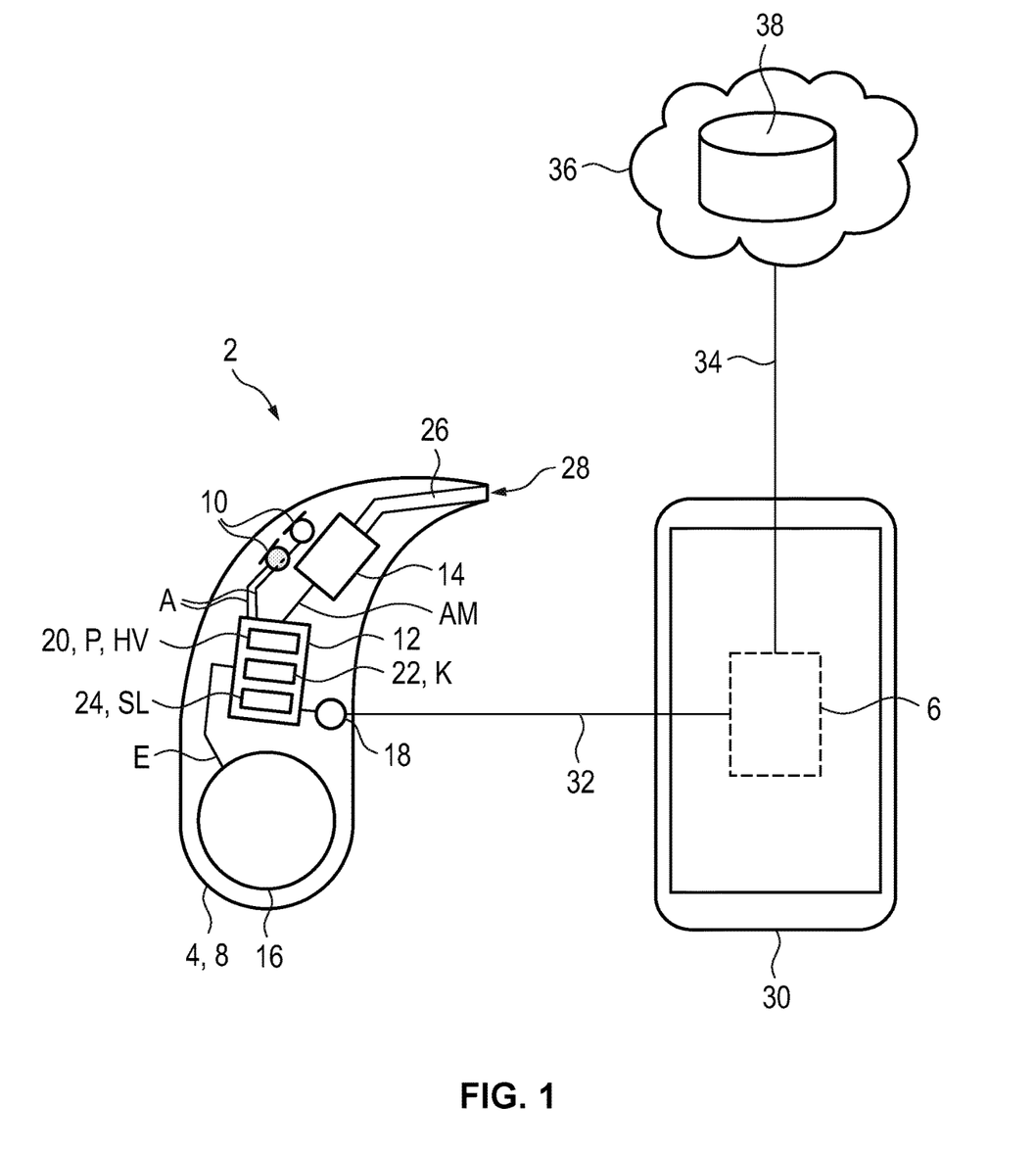
FIG. 1 is a schematic representation of a hearing system having a hearing instrument in which an audio signal of an ambient sound, recorded by means of an input transducer, is modified according to a multiplicity of signal processing parameters; and having a fitting unit for adapting the hearing instrument, the fitting unit being designed as an app installed on a smartphone.

FIG. 1 shows a rough schematic representation of a hearing system 2 comprising a hearing instrument 4 and a fitting unit 6. In the exemplary embodiment shown, the hearing instrument 4 is a BTE hearing aid.

The hearing instrument 4 comprises a housing 8 to be worn behind the ear of a hearing-impaired user, in which there are arranged as main components: two input transducers 10 in the form of microphones, a signal processing unit 12 with a digital signal processor (for example in the form of an ASIC) and/or a microcontroller, an output transducer 14 in the form of a receiver, and a battery 16. The hearing instrument 2 also comprises a radio transceiver 18 (RF transceiver) for wireless data exchange according to the Bluetooth standard.

During operation of hearing instrument 4, an ambient sound from the environment of hearing instrument 4 is picked up by the input transducer 10 and is output to the signal processing unit 12 as an audio signal A (i.e. as an electrical signal that carries the sound information). The audio signal A is processed by the signal processing unit 12. For this purpose, the signal processing unit 12 comprises a multiplicity of signal processing functions, including an amplifier, by which the audio signal A is amplified as a function of frequency, in order to compensate for the user's hearing impairment. The signal processing unit 12 is parameterized by a multiplicity of signal processing parameters P. Current values of these signal processing parameters P (which are thus used in the operation of the hearing instrument 4) are stored in a memory 20 that is associated with the signal processing unit 12 (an in particular is integrated in it). The memory 20 also stores user data that characterizes the hearing instrument user, in particular hearing loss data HV that characterizes the user's hearing loss.

The signal processing unit 12 additionally comprises a noise classifier 22 that continuously analyzes the audio signal A and assigns the sound information contained therein to one of a plurality of predetermined noise classes K based on this analysis. Specifically, the ambient sound is assigned for example to one of the following noise classes: "Music," "Speech in quiet," "Speech in noise," "Noise," "Quiet" or "Car." Depending on the noise class K, the signal processing unit 12 is operated in different hearing programs (and thus with different values for the signal processing parameter P). In a simple and expedient embodiment, the noise classifier 22 makes an unambiguous selection between the available noise classes, so that it always assigns the ambient sound to only one noise class at a time. A more sophisticated embodiment deviates from this in that the noise classifier 22 outputs a probability or similarity value for each of the available noise classes, so that mixed situations of the noise classes and continuous transitions between noise classes are also detected.

The signal processing unit 12 also comprises a level meter 24, which continuously measures the average sound level SL of the recorded ambient sound over the last 10 minutes.

The signal processing unit 12 outputs a modified audio signal AM resulting from this signal processing to the output transducer 14. The output transducer in turn converts the modified audio signal AM into a sound. This sound (modified relative to the recorded ambient sound) is first transmitted to a tip 28 of the housing 8 through a sound channel 26 by the output transducer 14, and from there through a (not explicitly represented) sound tube to an earpiece that may be or is inserted into the user's ear.

The signal processing unit 12 is supplied with electrical energy from battery 16.

In the exemplary embodiment shown, the fitting unit 6 is implemented as software in the form of an app installed on the user's smartphone 30. The smartphone 30 itself is not part of the hearing system 2 and is only used by it as a resource. Specifically, the fitting unit 6 uses the memory and computing power of the smartphone 30 to carry out a method for fitting the hearing instrument 4, described in greater detail below. Moreover, the fitting unit 6 uses a Bluetooth transceiver (not shown in greater detail) of the smartphone 30 for wireless communication, i.e. for exchanging data with the hearing instrument 4 via a Bluetooth connection 32, indicated in FIG. 1.

Via another wireless or wired data communication connection 34, for example based on the IEEE 802.11 standard (WLAN) or a mobile radio standard, for example LTE, the fitting unit 6 is also connected to a cloud 36 arranged in the Internet, in which a knowledge base 38 is installed. For exchanging data with the knowledge base 38, the fitting unit 6 accesses a WLAN (likewise not explicitly shown) or mobile phone interface of the smartphone 30.

Figure 2:
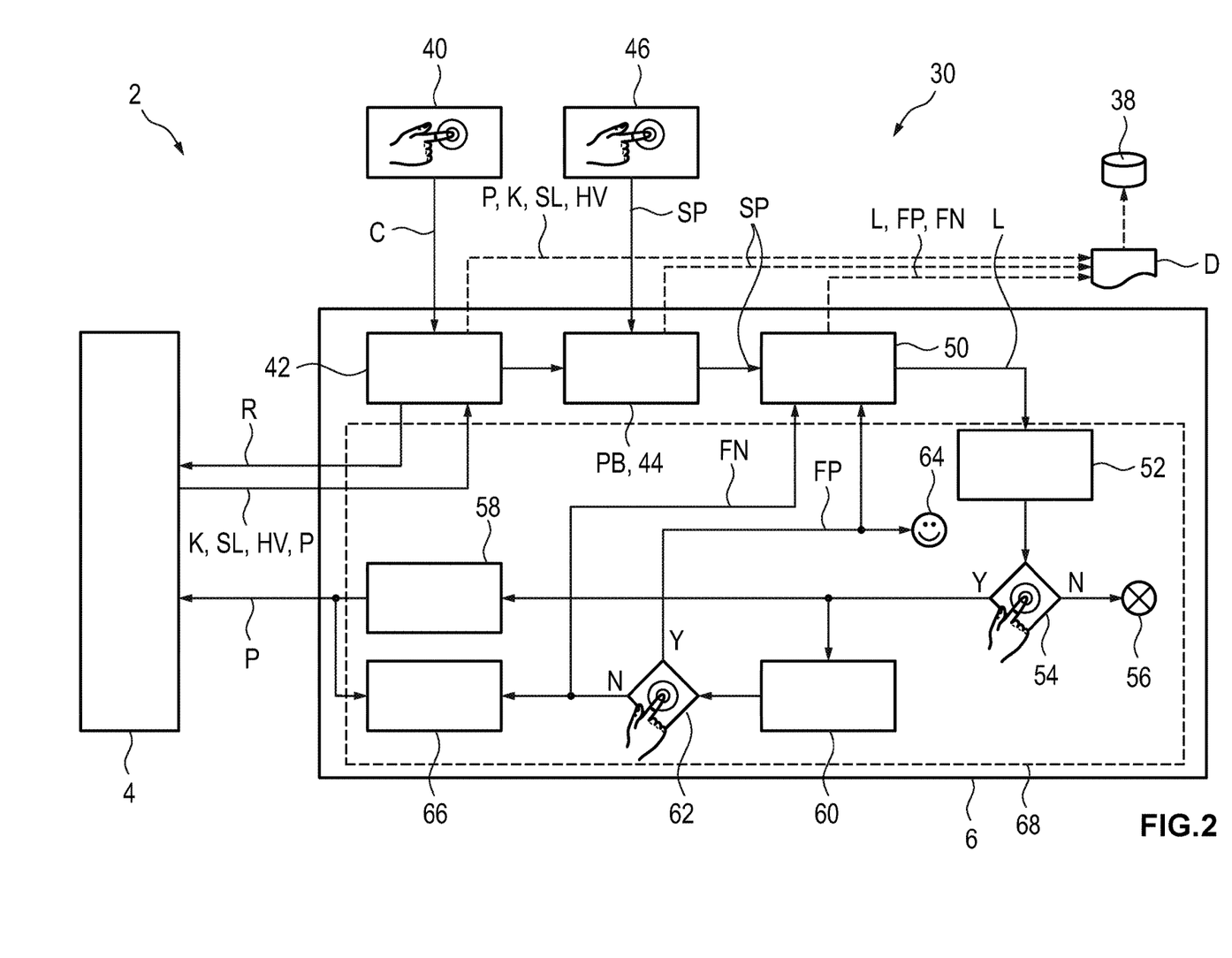
FIG. 2 is a schematic block diagram of the hearing system showing the progression of a hearing instrument fitting method carried out using this system.

The design of the fitting unit 6 and its interaction with the hearing instrument 4 and the user are shown in greater detail in FIG. 2.

The user of the hearing instrument 4 starts the fitting unit 6 if the user wishes to improve the signal processing that hearing instrument 4 is performing in a current hearing situation. For that purpose, the user presses a button 40 (icon) associated with the fitting unit 6 on the display of smartphone 30, for example by tapping this button 40 with a finger.

This generates a start command C that activates a data retrieval block 42 of the fitting module 6. The data retrieval block 42 then retrieves acoustic environment data, namely the current values of noise class K and average sound level SL, as well as user data, namely hearing loss data HV stored in the memory 20, from the hearing instrument 4 via the Bluetooth connection 32 by means of a request R (i.e. a retrieval command). The data retrieval block 42 continues to retrieve the current values of the signal processing parameters P from the memory 20 of the hearing instrument 4.

Frequency-resolved audiogram data may be retrieved and processed as hearing loss data HV. Alternatively, the data retrieval block 42 retrieves a simplified characterization of the user's hearing impairment from the hearing instrument 4, for example in the form of a classification of the hearing impairment on a three-level scale ("mild hearing impairment," "moderate hearing impairment," "severe hearing impairment"). Again alternatively, the data retrieval block 42 retrieves differentiated hearing loss data HV such as audiogram data from the hearing instrument 4, and this hearing loss data HV is then simplified by the fitting unit 6 for further processing, for example on a scale of the kind described above, and is processed in this simplified form.

The environment data and user data retrieved from the hearing instrument 4 are forwarded by the data retrieval block 42 to a block referred to as the problem classifier 44. Based on this data, i.e. based on
- the noise class K,
- the average sound level SL and
- the hearing loss data HV of the user, the problem classifier 44 selects a small number of problem descriptions PB (i.e. descriptions of potential problems to be solved with regard to the signal processing unit of the hearing instrument) from among a considerably larger number of stored problem descriptions PB, and offers these preselected problem descriptions PB to the user for selection by displaying them on the display of the smartphone 30.

The user then selects one of the displayed problem descriptions PB by pressing a button 46 shown on the display of the smartphone 30 (again for example by tapping with the finger). The problem classifier 44 sends a corresponding selection SP (and thus the problem to be solved that the user selected based on the problem description) to a block referred to as a solution classifier 50. In addition, the selection SP is evaluated in the problem classifier 44, in the manner described in greater detail below.

The solution classifier 50 also accesses the environment and user data retrieved from the hearing instrument 4. Based on this data, namely
- based on the user's selection SP of the problem to be solved,
- the noise class K,
- the average sound level SL, and
- the user's hearing loss data HV, the solution classifier 50 determines a first proposed solution L for improving the signal processing of the hearing instrument 4. The proposed solution L comprises a proposed change for at least one signal processing parameter P of the hearing instrument 4, i.e. an increase or decrease of the value of the corresponding signal processing parameter P.

In a block 52, the fitting unit 6 informs the user of the proposed solution L by showing a corresponding solution description on the display of the smartphone 30, and asks the user to confirm or reject the implementation of the solution L on the hearing instrument 4.

The user confirms or rejects the request by pressing a button 54 shown on the display of the smartphone 30. If the user rejects (N) the implementation of the proposed solution L, the fitting unit 6 aborts the method in a block 56.

If, in contrast, the user confirms (Y) the implementation of the proposed solution L, the fitting unit 6 calculates modified values for the signal processing parameters P corresponding to solution L in a block 58. The block 58 sends these modified values to the hearing instrument 4 via the Bluetooth connection 32. In the hearing instrument 4, the modified values are associated with the signal processing parameters P, so that the hearing instrument 4 now carries out signal processing based on these modified values.

Simultaneously with the implementation of the solution L in the hearing instrument 4, the fitting unit 6 asks the user to evaluate the proposed solution L in a block 60, by displaying a message on the display of the smartphone 30. In the course of the evaluation, the user decides, by pressing a button 62, whether to retain or discard the modified settings of the signal processing parameters P on the hearing instrument 4.

If the user decides to retain (Y) the modified settings of the signal processing parameters P on the hearing instrument 4, a positive feedback FP is generated as an evaluation and is fed to the solution classifier 50. Subsequently, the fitting unit 6 terminates the method in a block 64.

If the user decides to discard (N) the modified settings of the signal processing parameters P on the hearing instrument 4, a negative feedback FN is generated as an evaluation and is fed to the solution classifier 50. In addition, a block 66 is activated, which feeds back the original values of the signal processing parameters P to the hearing instrument 4, thus cancelling the modification of the signal processing parameters P.

Based on the negative feedback FN, the solution classifier 50 determines an alternative, second proposed solution L. With the second proposed solution L (and possibly an additional proposed solution L), the method described above (blocks 52 to 66) is repeated one or more times until the user positively evaluates an alternative solution L or aborts the method.

For each user-provided positive or negative feedback FP or FN for a proposed solution L, the fitting unit 6 summarizes the original values of the signal processing parameters P, the collected environment and user data (i.e. the noise class K, average sound level SL, and hearing loss data HV), the selection SP, the respective proposed solution L and associated evaluation (i.e. the positive or negative feedback FP or FN) into a data set D, and sends this data set D to the knowledge base 38.

The blocks 42, 44, 50, 52, 56, 58, 60, 64, 66 and the buttons 40, 46, 54 and 62 are preferably implemented as software routines (for example in the form of functions, objects or components). The ensemble of blocks 52, 56, 58, 60, 64, 66 and the buttons 54 and 62 is collectively referred to as the evaluation module 68.

Figure 3:
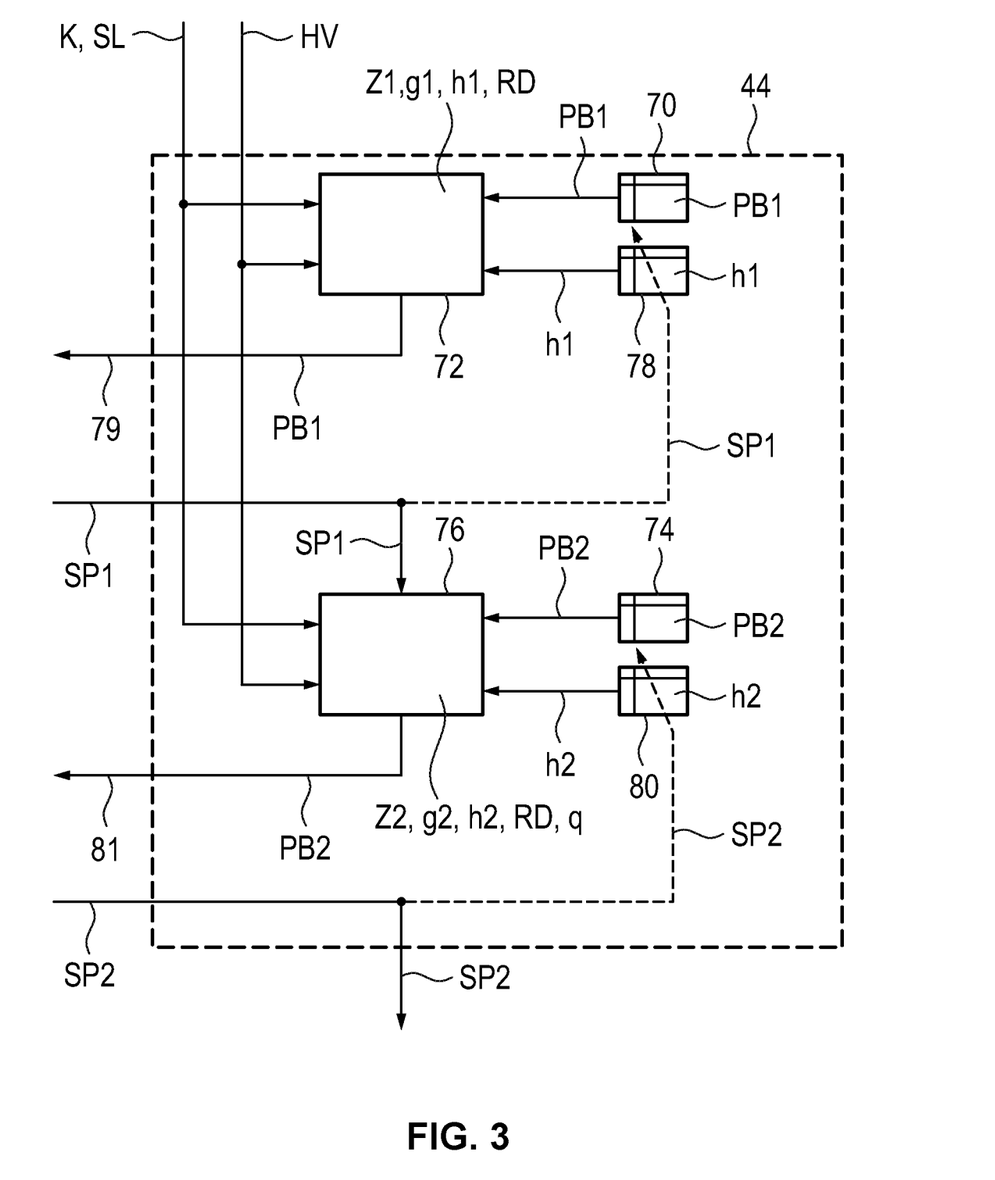
FIG. 3 is a schematic block diagram of an exemplary structure of a first classifier (problem classifier) of the fitting unit, here designed as a two-stage, dynamic decision tree.
Figure 4:
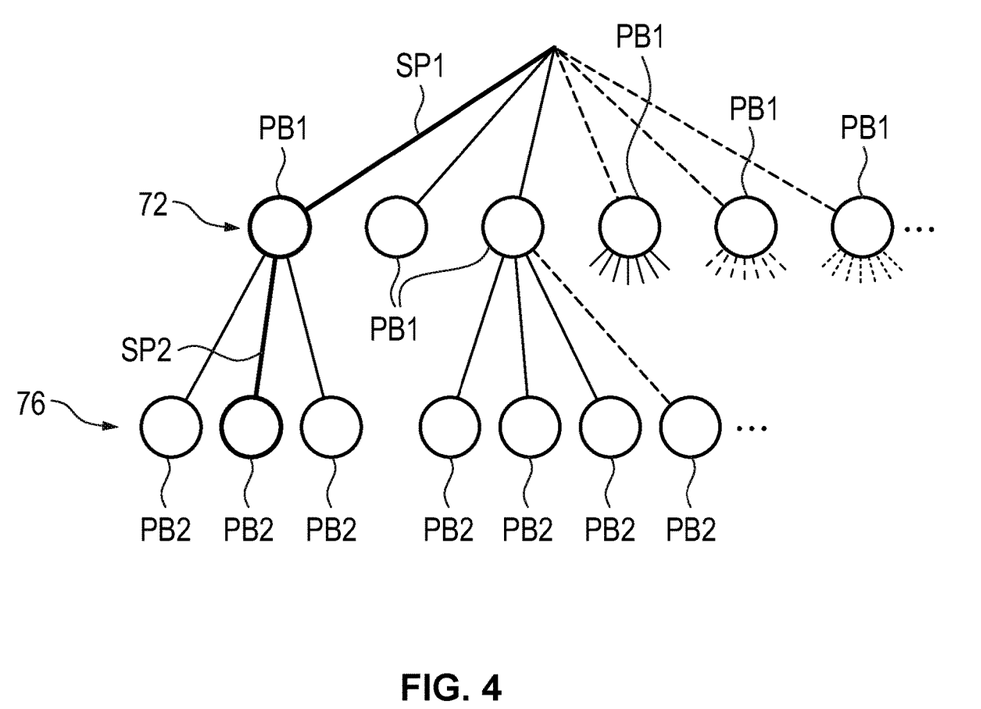
FIG. 4 shows a dependency scheme showing an exemplary decision tree structure of the first classifier as shown in FIG. 3.

An exemplary embodiment for the structure of the problem classifier 44 is shown in greater detail in FIG. 3. In this example, the problem classifier 44 is designed as a two-stage dynamic decision tree, shown as a schema in FIG. 4.

In a list 70 associated with a first stage 72 of the problem classifier 44, a plurality of problem descriptions PB1 for higher-level problem areas are stored.

In a list 74 associated with a second stage 76 of the problem classifier 44, a plurality of more specific problem descriptions PB2 are respectively stored for at least one of the problem descriptions PB1 of the first stage 72 (but usually for the majority of the problem descriptions PB1).

For example, the list 70 of the first stage 72 contains the higher-level problem description PB1 "Problem with own voice." Associated with this general problem description PB1, the list 74 of the second stage 76 contains for example the specific problem descriptions PB2 "own voice sounds too loud," "own voice sounds too soft," "own voice sounds nasal."

The underlying tree structure of the problem classifier 44 is dynamic in that the problem classifier 44 pre-selects the displayed problem descriptions PB1 and PB2 as a function of the environmental and user data, i.e. based on the noise class K, the average sound level SL and the hearing loss data HV with respect to number and sequence.

In addition to the data mentioned above, the problem classifier 44 also takes into account, in this preselection, the relative frequencies h1 and h2 with which the individual problem descriptions PB1 and PB2 were previously selected. Corresponding values of these frequencies h1 and h2 are stored in a list 78 for problem descriptions PB1 of the first stage 72, and in a list 80 for problem descriptions PB2 of the second stage 76. The contents of the lists 70, 74, 78 and 80 may alternatively be combined in other ways, for example in one or two lists.

The problem descriptions PB1 and PB2 to be displayed in the first stage 72 and second stage 76 respectively are preselected by the problem classifier 44 in a weighted pseudo-random manner.

For this purpose, the problem classifier 44 assigns a relevance number Z1 to all problem descriptions PB1 from the list 70 in the first step 72, and determines this number, for example, according to the formula $$Z1 = g1 * h1 * RD$$

where:
  g1=g1(K, SP, HV) for a numeric weight dependent on the noise class K, average sound level SL and hearing loss data HV, and
  RD is a pseudo-random number.

The dependencies of the numeric weight g1 on the noise class K, the average sound level SL and the hearing loss data HV are defined (for example empirically) for each of the problem descriptions PB1 from the list 70 and are predetermined, for example, by a table of characteristic values or a mathematical function. This numeric weight g1 is preferably defined in such a way that the more relevant the problem description PB1 is from an audiological point of view for the respective case, the greater will be its value derived from the environmental and user data mentioned. Preferably, however, the selected numeric weight g1 is always between 0 and 1 (g1=[0, 1]).

The pseudo-random number RD is freshly determined for each relevance number Z1.

In the first stage 72, the problem classifier 44 sorts the problem descriptions PB1 according to the magnitude of the associated relevance number Z1 and displays a certain number of problem descriptions PB1 in the sequence of their respectively associated relevance numbers Z1. In the schema shown in FIG. 3, this is indicated by the arrow 79 pointing toward the left from the first stage 72. In particular, the four problem descriptions PB1 with the highest relevance numbers Z1 are always displayed. These four problem descriptions PB1 are connected by solid lines in the schema shown in FIG. 4. For example, the first stage 72 displays the following problem descriptions PB1 for selection:

"Problem with own voice"
"Problem understanding the speech of others"
"Problem with sound quality"
"Problem with operating the hearing aid"

The other problem descriptions PB1 with smaller relevance number Z1 are not initially displayed to the user.

Preferably, however, in addition to the four displayed problem descriptions PB1, the field "None of the above problems"

is displayed to the user for selection. If the user selects this field, the first stage 72 displays the four problem descriptions PB1 that have the next-lower relevance numbers Z1. If, in contrast, the user selects one of the four problem descriptions PB1 initially shown (for example the first problem description "problem with own voice"), this selection SP1 is passed to the second stage 76.

In the second stage 76, a number of specific problem descriptions PB2 are preselected analogously, by evaluating and sorting the problem descriptions PB2 according to relevance.

The second stage in turn determines a relevance number for each problem description PB2

$$Z2 = q * g2 * h2 * RD$$

where g2=g2(K, SP, HV), here in turn a numeric weight between 0 and 1 (g2=[0, 1]), RD is a pseudo-random number, and q=q(SP1), a binary quantity.

The dependencies of the numeric weight g2 on the noise class K, the average sound level SL and the hearing loss data HV are defined (for example empirically) for each of the problem descriptions PB2 from the list 74 and are in turn predetermined, for example, by a table of characteristic values or a mathematical function.

The binary quantity q=q(S1), which depends on the selection SP1, has the value 1 for all problem descriptions PB2 associated with the problem description PB1 that was selected in the first stage 72. For all other problem descriptions PB2, the binary quantity q has the value 0.

In the second stage 76 in turn, the problem classifier 44 sorts the problem descriptions PB2 according to the magnitude of the associated relevance number Z2 and displays a certain number of (for example three) problem descriptions PB2 in the sequence of their respectively assigned relevance numbers Z2. In the schema shown in FIG. 3, this is indicated by an arrow 81 pointing toward the left from the second stage 76. For example, the second stage 76 displays the following problem descriptions PB2 for selection:

"own voice too loud"

"own voice too soft"

"own voice nasal"

Moreover preferably once again the field

"None of the above problems"

is also displayed for selection. If the user selects this field, the second stage 76 displays the three problem descriptions PB2 with the next lower relevance numbers Z2. If, in contrast, the user selects one of the three displayed problem descriptions PB2 (for example the second problem description "own voice too quiet"), this selection SP2 is output by the problem classifier 44.

Based on the selection SP1 and SP2, the relative frequencies h1 and h2 in lists 78 and 80 are adjusted by increasing the relative frequencies h1 and h2 of the respectively user-selected problem descriptions PB1 and PB2. Thus, the problem classifier 44 adapts itself to the user's selection behavior in a self-learning manner: Those problem descriptions PB1 and PB2 that the user frequently selects are displayed by the problem classifier 44 with higher priority (i.e. more frequently and higher up in the order) than those problem descriptions PB1 and PB2 that the user selects less frequently.

In alternative embodiments, the problem classifier 44 has only one stage or has more than two stages. Alternatively, in turn, the problem classifier 44 is based on an artificial neural network, similarly to the solution classifier 50 described below.

As mentioned above, the solution classifier 50 comprises as a central structure an artificial neural network (ANN 82) (shown only schematically in FIG. 5), which is preferably designed as a fully networked multi-layer feed-forward network, having for example an input layer, an output layer and one or more hidden layers of artificial neurons.

Figure 5:
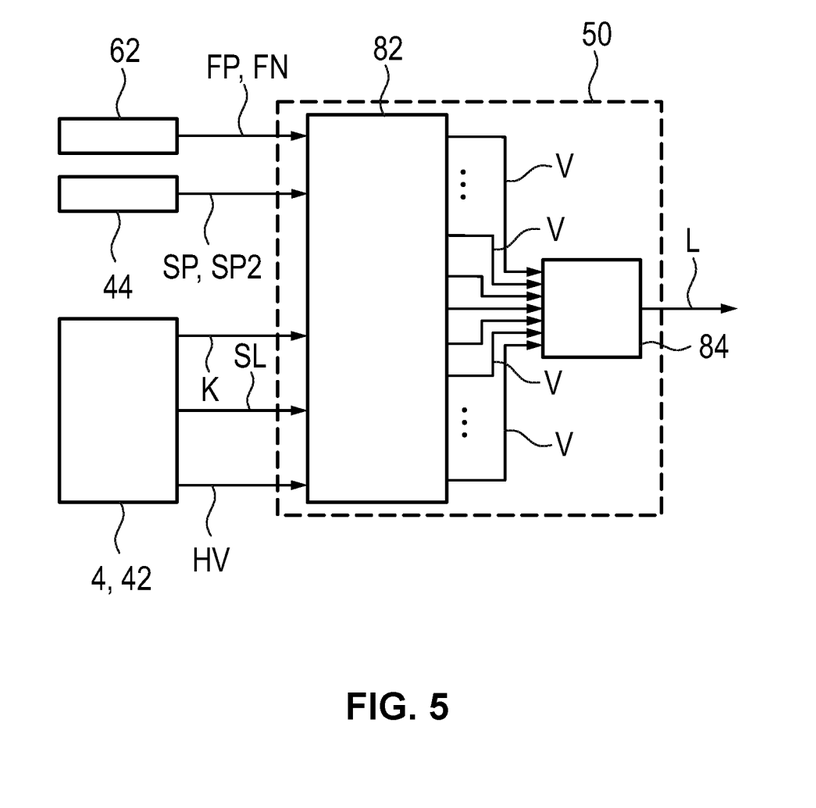
FIG. 5 is a schematic block diagram showing a second classifier (solution classifier) of the fitting unit, comprising an artificial neural network.

Via the data retrieval block 42 of the fitting unit 6, the solution classifier 50 (and thus the ANN 82) receives the noise class K, the average sound level SL, and the hearing loss data HV from the hearing instrument 4 as input variables. As additional input variables, the solution classifier 50 (and thus the ANN 82) receives the selection SP (or in the case of the two-stage problem classifier 44 from FIGS. 3 and 4 the selection SP2) from the problem classifier 44 regarding the problem to be solved.

Based on these input variables, the ANN 82, which is in a trained state when the hearing system 4 is in operation, outputs a value V for a number of predetermined possible solutions (for example 80 possible solutions), which characterizes the expected success of the respectively associated solution. In an expedient embodiment of the ANN 82, each neuron of the output layer of the ANN 82 is assigned to a specific possible solution. In the above example, the ANN 82 thus contains 80 neurons in its output layer to evaluate 80 possible solutions. The output value of the respective neuron represents the numeric value V of the associated solution.

In a validation block 84 downstream of the ANN 82, the solution classifier 50 selects one of this plurality of proposed solutions L based on the numeric values V and displays it to the user as described above. In a simple and expedient implementation, the validation block 84 proposes the available solutions deterministically in the sequence of their assigned numeric values V: First, the solution with the maximum value V is selected, then, if the user rejects that solution, the solution with the next lower value, and so forth. In a more sophisticated embodiment, the validation block 84 randomly selects a solution from a number of solutions with particularly high values V (for example from among the five solutions with the highest value V) in order to increase the entropy of the proposed solutions L and thus improve the learning efficiency of the ANN 82.

The user's evaluation associated with the respective proposed solution L, i.e. the positive or negative feedback FP or FN, is used by the ANN 82 as a reward. The configuration of the ANN 82 is adjusted based on the reward, by means of conventional reinforcement learning methods. The solution classifier 50 also adapts itself to user behavior in a self-learning manner. Those proposed solutions L that have been evaluated positively (or not negatively) are proposed in the course of this adaptation with higher priority (i.e. more frequently and/or in a higher order) than those solutions L that have been evaluated negatively.

In the course of the development and refinement of the hearing system 4, the ANN 82 is trained by the manufacturer (in particular before the hearing system 4 is delivered to the user) based on the data records D of a multiplicity of users contained in the knowledge base 38, using conventional methods of reinforcement learning, in particular by using a gradient descent procedure. Alternatively or additionally to tis (for example as long as the knowledge base 38 does not yet contain enough data records D from the real everyday life of users in its development phase), corresponding data records D are artificially generated by audiologists for training the ANN 82.

Figure 6:
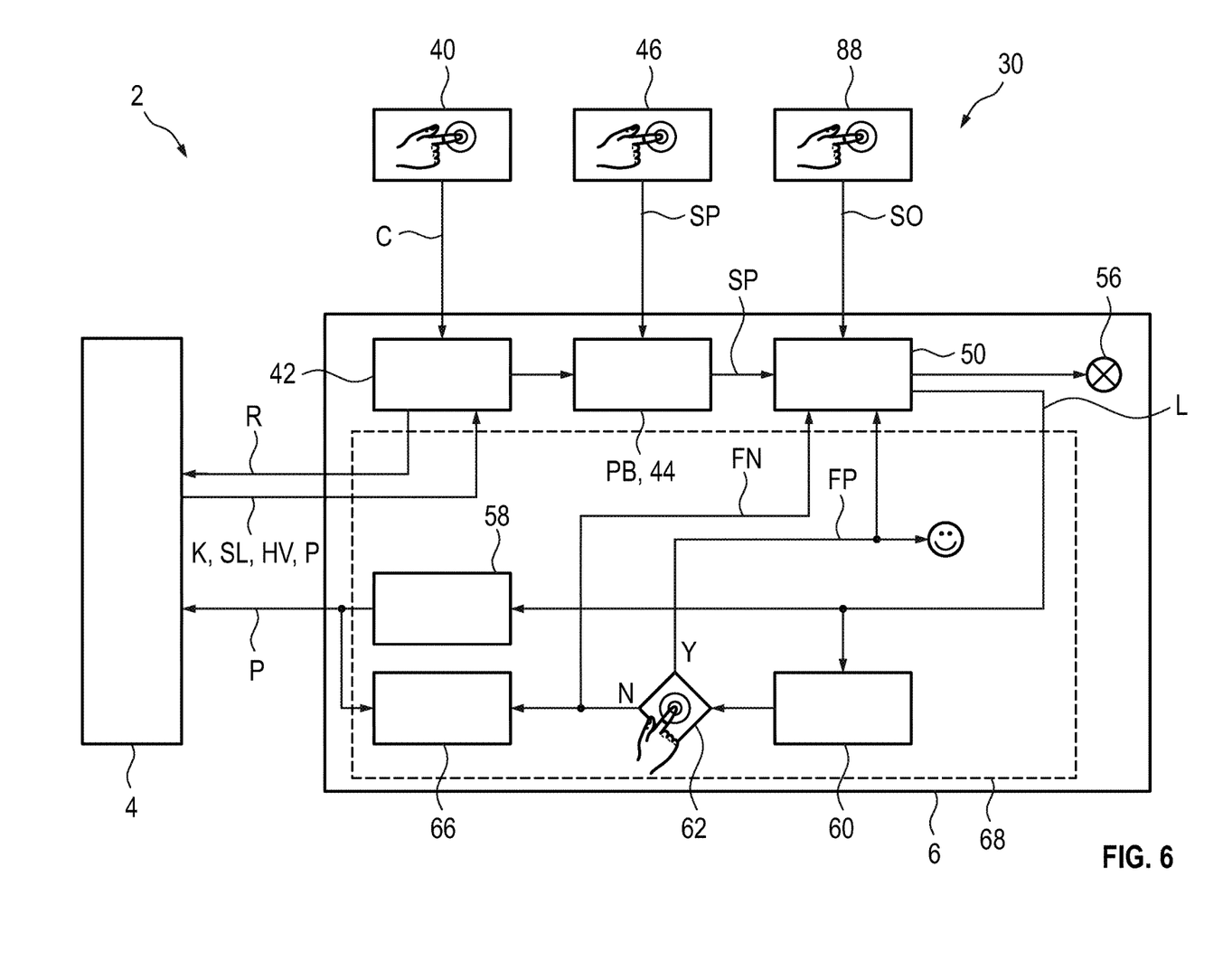
FIG. 6 is an illustration according to FIG. 2, showing the hearing instrument with an alternative embodiment of the fitting unit.

A variant of the fitting unit 6 is shown in FIG. 6. This differs from the fitting unit 6 in FIG. 2 in that the solution classifier 50 presents to the user for selection a plurality of proposed solutions L, displayed at the same time on the display of the smartphone 30. The user then selects one of these proposed solutions L by pressing a button 88 shown on the display of the smartphone 30 (again for example by tapping it with the finger). The proposed solution L corresponding to this selection SO is then implemented—either immediately, as shown in FIG. 6, or after being re-confirmed by the user—in the hearing instrument 4. If the user does not select any of the proposed solutions L that are offered, the method is terminated in block 56.

Preferably, in this variant of the fitting unit 6 as well, for each positive or negative feedback FP or FN, the original values of the signal processing parameters P, the collected environmental and user data, the selection SP and the respective proposed solution L together with the associated evaluation (i.e. the positive or negative feedback FP or FN) are uploaded to the knowledge base 38 in a data set D.

In all of the above-described exemplary embodiments, the communication between the fitting unit 6 and the user may also be carried out acoustically by voice control. The fitting unit 6 outputs the problem descriptions PB, PB1, PB2 and proposed solutions L by automatically-generated spoken language via the loudspeaker of the smartphone 30 and/or—preferably—via the output transducer 14 of the hearing instrument 4, and receives the selection SP, SP1, SP2 and, if applicable, SO via the microphone of the smartphone 30 and/or—again preferably—via the input transducer 10 of the hearing instrument 4.

The invention is particularly clear in the above-described exemplary embodiments, but is not limited to these exemplary embodiments. Rather, numerous additional embodiments of the invention may be derived from the claims and the above description.

LIST OF REFERENCE SIGNS

2 Hearing system
4 Hearing instrument
6 Fitting unit
8 Housing
10 Input transducer
12 Signal processing unit
14 Output transducer
16 Battery
18 Radio transceiver
20 Memory
22 Noise classifier
24 Level meter
26 Sound channel
28 Tip
30 Smartphone
32 Bluetooth connection
34 Data communication device
36 Cloud
38 Knowledge base
40 Button
42 Data retrieval block
44 Problem classifier
46 Button
50 Solution classifier
52 Block
54 Button
56 Block
58 Block
60 Block
62 Button
64 Button
66 Block
68 Evaluation module
70 List
72 (First) stage
74 List
76 (Second) stage
78 List
80 Arrow
81 List
82 Arrow
84 ANN
86 Validation block
88 Training module
Button
A Audio signal
AM (Modified) sound signal
C Start command
D Data set
E (Electrical) energy
FN (Negative) feedback
FP (Positive) feedback
g1 Numeric weight
g2 Numeric weight
h1 (relative selection) frequency
h2 (relative selection) frequency
HV Hearing loss data
K Noise class
L Proposed solution
L' Proposed solution
P (Signal processing) parameters
PB Problem description
PB1 Problem description
PB2 Problem description
q (binary) quantity
R Request
RD Random number
SL Sound level
SO Selection
SP Selection
SP1 Selection
SP2 Selection
V Numeric value
W Reward
Z1 Relevance number
Z2 Relevance number

The invention claimed is:

1. A method for fitting a hearing instrument wherein an audio signal of an ambient sound, recorded by way of an input transducer, is modified in accordance with a multiplicity of signal processing parameters, the method comprising:
    causing a first classifier to offer a user of the hearing instrument a plurality of problem descriptions for selection; and
    determining with a second classifier a proposed solution for modified values of the signal processing parameters based on a selection by the user of one of the problem descriptions offered for the selection.

2. The method according to claim 1, which comprises preselecting with the first classifier the offered problem descriptions and/or a sequential order of the offered problem descriptions based on one or both of environment data that characterizes an acoustic environment of the hearing instrument and/or based on user data that characterizes the user.

3. The method according to claim 2, which comprises determining the proposed solution with the second classifier based on one or both of environment data that characterizes an acoustic environment of the hearing instrument or user data that characterizes the user.

4. The method according to claim 3, wherein the environment data used by the first classifier and/or by the second classifier are selected from the group consisting of:
an average level of the recorded audio signal;
an average signal-to-noise ratio of the recorded audio signal;
a noise class associated with the audio signal; and
data on wind activity.

5. The method according to claim 3, wherein the user data used by the first classifier and/or by the second classifier are selected from the group consisting of:
data that characterizes a hearing ability of the user;
data that characterizes an acoustic coupling of the hearing instrument with the user;
data concerning a type of the hearing instrument;
an age of the user;
a gender of the user;
a degree of activity of the user;
a location of the user;
the user's language; and
a measure of the user's need for advice.

6. The method according to claim 1, which comprises, with the first classifier:
detecting selection frequencies representing how often the user selects the offered problem descriptions; and
pre-selecting the offered problem descriptions and/or the sequence thereof, based on the detected selection frequencies.

7. The method according to claim 1, which comprises:
setting the modified values of the signal processing parameters that correspond to the proposed solution in the hearing instrument;
asking the user to evaluate the proposed solution; and
depending on a result of an evaluation of the proposed solution, selectively retaining or discarding the modified values of the signal processing parameters in the hearing instrument.

8. The method according to claim 7, which comprises:
determining an alternative proposed solution for modified values of the signal processing parameters using the second classifier; and
in the event of a negative evaluation of a previous proposed solution, setting the modified values of the signal processing parameters corresponding to the alternative proposed solution in the hearing instrument.

9. The method according to claim 7, which comprises determining with the second classifier the proposed solution for modified values of the signal processing parameters based on the selection by the user and, in addition, based on previous evaluations.

10. The method according to claim 1, which comprises feeding the user's selection of one of the offered problem descriptions and the proposed solution and, if appropriate, an associated evaluation as a data set to a knowledge base which contains corresponding data sets of a multiplicity of users, and obtaining the presets of the first classifier and/or second classifier based on the data sets contained in the knowledge base.

11. A hearing system, comprising:
a hearing instrument having an input transducer for receiving an audio signal of an ambient sound and a signal processing unit for modifying the audio signal in accordance with a multiplicity of signal processing parameters; and
a fitting unit for fitting the hearing instrument, said fitting unit including a first classifier and a second classifier, and wherein:
said first classifier is configured to offer a user of the hearing instrument a plurality of problem descriptions for selection; and
said second classifier is configured to determine a proposed solution for modified values of the signal processing parameters based on a selection made by the user of one of the problem descriptions offered.

12. The hearing system according to claim 11, wherein said first classifier is configured to preselect the offered problem descriptions and/or a sequence thereof based on one or both of environment data that characterizes the acoustic environment of the hearing instrument or user data that characterizes the user.

13. The hearing system according to claim 12, wherein said second classifier is configured to determine the proposed solution additionally based on at least one of environment data that characterizes the acoustic environment of the hearing instrument or user data that characterizes the user.

14. The hearing system according to claim 13, wherein said first classifier and/or said second classifier are configured to utilize user data selected from the group consisting of:
data that characterizes a hearing ability of the user;
data that characterizes an acoustic linkage of the hearing instrument with the user;
data concerning a type of the hearing instrument;
an age of the user;
a gender of the user;
a degree of activity of the user;
a location of the user;
the user's language; and
a measure of the user's need for advice.

15. The hearing system according to claim 13, wherein said first classifier and/or said second classifier are configured to utilize environment data selected from the group consisting of:
an average level of the recorded audio signal;
an average signal-to-noise ratio of a recorded audio signal;
a noise class associated with the audio signal; and
data on wind activity.

16. The hearing system according to claim 11, wherein said first classifier is configured to detect selection frequencies with which the user selects the offered problem descriptions, and to pre-select the offered problem descriptions and/or a sequence thereof based additionally on the detected selection frequencies.

17. The hearing system according to claim 11, wherein said fitting unit comprises an evaluation module configured to:
set the modified values of the signal processing parameters in said hearing instrument that correspond to the proposed solution;

request the user to evaluate the proposed solution; and depending on a result of the evaluation, retain or discard the modified values of the signal processing parameters in the hearing instrument that correspond to the proposed solution.

18. The hearing system according to claim 17, wherein:

said second classifier is configured to determine an alternative proposed solution for modified values of the signal processing parameters; and said evaluation module is configured, on occasion of a negative evaluation of a previous proposed solution, to set the modified values of the signal processing parameters in the hearing instrument that correspond to the alternative proposed solution.

19. The hearing system according to claim 17, wherein said second classifier is configured to additionally determine the, or each, proposed solution based on previous evaluations.

20. The hearing system according to claim 11, wherein at least one of said first classifier or said second classifier is an artificial neural network.

21. The hearing system according to claim 20, wherein said neural network is a fully-networked, multi-layer feed-forward network or a decision tree.

\* \* \* \* \*